United States Patent
Bowley et al.

(10) Patent No.: US 10,041,308 B2
(45) Date of Patent: Aug. 7, 2018

(54) OILFIELD TUBULAR CONNECTION SYSTEM AND METHOD

(71) Applicant: Nabors Drilling Technologies USA, Inc., Houston, TX (US)

(72) Inventors: Ryan Thomas Bowley, Calgary (CA); Brent James-William Coombe, Calgary (CA); Cory John Genovese, Calgary (CA)

(73) Assignee: Nabors Drilling Technologies USA, Inc., Houston, TX (US)

(*) Notice: Subject to any disclaimer, the term of this patent is extended or adjusted under 35 U.S.C. 154(b) by 312 days.

(21) Appl. No.: 14/963,985

(22) Filed: Dec. 9, 2015

(65) Prior Publication Data

US 2017/0167203 A1   Jun. 15, 2017

(51) Int. Cl.
 *F16J 15/00* (2006.01)
 *E21B 17/043* (2006.01)
 *F16L 15/00* (2006.01)
 *F16L 15/08* (2006.01)

(52) U.S. Cl.
 CPC .......... *E21B 17/043* (2013.01); *F16L 15/001* (2013.01); *F16L 15/08* (2013.01)

(58) Field of Classification Search
 CPC ..... F16L 15/001; F16L 15/006; F16L 15/008; F16L 19/005
 USPC ........................... 285/414, 412, 92, 403, 404
 See application file for complete search history.

(56) References Cited

U.S. PATENT DOCUMENTS

| | | | | | |
|---|---|---|---|---|---|
| 3,015,500 | A | * | 1/1962 | Barnett | E21B 17/06 285/332.3 |
| 3,086,796 | A | * | 4/1963 | Yancey | E21B 17/043 285/323 |
| 3,222,075 | A | * | 12/1965 | Haeber | E21B 33/06 251/1.2 |
| 3,442,536 | A | * | 5/1969 | Fowler | E21B 17/08 285/27 |
| 3,450,298 | A | * | 6/1969 | Strohmeier | F16J 13/12 220/304 |
| 3,866,954 | A | * | 2/1975 | Slator | F16L 15/00 285/333 |
| 4,444,421 | A | * | 4/1984 | Ahlstone | E02D 5/523 285/334 |
| 4,479,669 | A | * | 10/1984 | Hynes | E21B 17/046 285/332.3 |
| 4,487,433 | A | | 12/1984 | Miller | |
| 4,601,498 | A | * | 7/1986 | Haugen | E21B 17/042 277/338 |
| 4,613,161 | A | * | 9/1986 | Brisco | E21B 17/08 166/380 |
| 4,907,828 | A | * | 3/1990 | Chang | E21B 47/011 285/184 |

(Continued)

OTHER PUBLICATIONS

PCT/US2016/065752 International Search Report and Written Opinion dated Mar. 17, 2017.

*Primary Examiner* — Aaron M Dunwoody
(74) *Attorney, Agent, or Firm* — Enrique Abarca; Abel Law Group, LLP

(57) ABSTRACT

A mineral extraction system including a first oilfield tubular, a second oilfield tubular to engage with the first oilfield tubular, a first flange coupled to the first oilfield tubular, a second flange coupled to the second oilfield tubular, and a plurality of fasteners to couple the first flange and the second flange.

15 Claims, 4 Drawing Sheets

(56) References Cited

U.S. PATENT DOCUMENTS

| | | | | |
|---|---|---|---|---|
| 5,059,043 | A | * | 10/1991 | Kuhne .................... E21B 17/00 166/243 |
| 6,860,514 | B2 | * | 3/2005 | Wentworth ............. E21B 17/04 285/333 |
| 2008/0111375 | A1 | | 5/2008 | Bilderbeek |
| 2015/0096764 | A1 | | 4/2015 | Magnuson et al. |

* cited by examiner

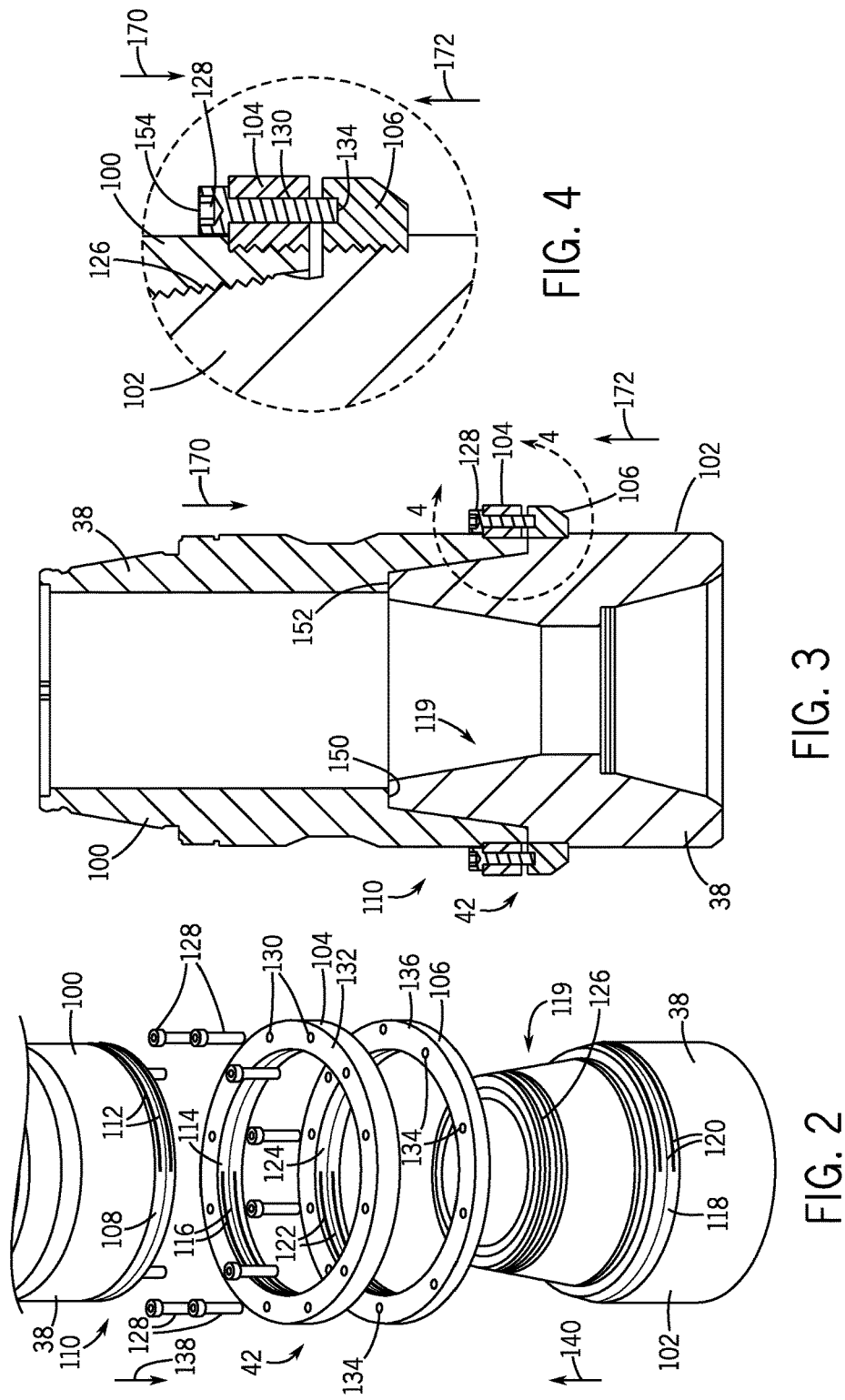

OILFIELD TUBULAR CONNECTION SYSTEM AND METHOD

BACKGROUND

Embodiments of the present disclosure relate generally to the field of drilling and processing of wells. More particularly, present embodiments relate to a system and method for coupling two tubulars of a mineral extraction system.

In conventional oil and gas operations, a drilling rig is used to drill a wellbore to a desired depth using a drill string, which includes drillpipe, drill collars and a bottom hole drilling assembly. During drilling, the drill string may be turned by a rotary table and kelly assembly or by a top drive to facilitate the act of drilling. As the drill string progresses down hole, additional drillpipe is added to the drill string.

Once the desired depth is reached, the drill string is removed from the hole and casing is run into the vacant hole. In some conventional operations, the casing may be installed as part of the drilling process. A technique that involves running casing at the same time the well is being drilled may be referred to as "casing-while-drilling." Casing may be defined as pipe or tubular that is placed in a well to prevent the well from caving in, to contain fluids, and to assist with efficient extraction of product. When the casing is properly positioned within a hole or well, the casing is typically cemented in place by pumping cement through the casing and into an annulus formed between the casing and the hole (e.g., a wellbore or parent casing). Once a casing string has been positioned and cemented in place or installed, the process may be repeated via the now installed casing string. For example, the well may be drilled further by passing a drilling BHA through the installed casing string and drilling. Further, additional casing strings may be subsequently passed through the installed casing string (during or after drilling) for installation. Indeed, numerous levels of casing may be employed in a well.

Completion of these drilling and casing operations generally involves the coupling of many tubular components to one another, such as the drillpipe, drill collars, bottom hole drilling assembly, and pipes mentioned above, as well as other tubular components, such as quills, mud saver valves, saver subs, pipe drive systems, casing drive systems, plug launchers, and so forth. In many circumstances, these tubular components may be connected via a threaded connection and may be connected or torqued to a specified load or torque value to ensure that the tubular components do not loosen or become disconnected during use. Unfortunately, connecting or threading tubular components to such specifications can be difficult and time-consuming and generally require high-torque devices to connect and disconnect the tubulars.

BRIEF DESCRIPTION

In one embodiment, a system includes a first oilfield tubular, a second oilfield tubular configured to threadingly engage with the first oilfield tubular, a first flange coupled to the first oilfield tubular, a second flange coupled to the second oilfield tubular, and a plurality of fasteners configured to couple to the first flange and the second flange.

In another embodiment, a method includes threading a first oilfield tubular component to a second oilfield tubular component, abutting a first flange of the first oilfield tubular component with a second flange of the second oilfield tubular component, and subsequently coupling the first flange and the second flange to a plurality of fasteners disposed about a circumference of the first flange and the second flange.

In a further embodiment, a system includes a first oilfield tubular, wherein the first oilfield tubular comprises a threaded box connection at a first axial end of the first oilfield tubular, a second oilfield tubular, wherein the second oilfield tubular comprises a threaded pin connection at a second axial end of the second oilfield tubular, a first flange coupled to the first axial end of the first oilfield tubular, wherein the first flange comprises a plurality of apertures arrayed about a first circumference of the first flange, and a second flange coupled to the second axial end of the second oilfield tubular, wherein the second flange comprises a plurality of recesses arrayed about a second circumference of the second flange, wherein each of the plurality of apertures is configured to align with a respective one of the plurality of recesses.

DRAWINGS

These and other features, aspects, and advantages of present embodiments will become better understood when the following detailed description is read with reference to the accompanying drawings in which like characters represent like parts throughout the drawings, wherein:

FIG. 2 is an exploded perspective view of two tubular components and a tubular coupling system, in accordance with present techniques;

FIG. 3 is a cross-sectional side view of a tubular coupling system connecting two tubular components, in accordance with present techniques;

FIG. 4 is cross-sectional side view of the tubular coupling system of FIG. 3, taken within line 4-4 of FIG. 3, in accordance with present techniques;

DETAILED DESCRIPTION

Present embodiments provide a system and method coupling or connecting two tubular components (e.g., sections of casing or drill pipe) of a mineral extraction system. As described in detail below, a tubular coupling system includes two coupling rims or flanges and a plurality of mechanical fasteners, such as bolts. For example, a first rim or flange may be coupled to an end of a first tubular component, and a second rim or flange may be coupled to an end of the second tubular component. The ends of the two tubular components may be initially threaded together via respective integral threads of the tubular components (e.g., manually or using hand tools) until threading manually or with hand tools is no longer possible or practical. After the two tubular components are initially threaded together, the plurality of mechanical fasteners is coupled to the first and second rims or flanges. The mechanical fasteners may also be coupled to the rims or flanges using hand tools. In this manner, which is described in further detail below, the integral threads of the tubular components may be energized to a pre-loaded condition without the use of a high-torque device. For example, the axial coupling of the flanges with the fasteners may bring the two threaded tubular components closer to one another and create friction between the threads of the two tubular components. In another embodiment, the fasteners may be threaded to one flange and axially abut the other flange to force the two flanges axially away from one another, thereby forcing the two threaded tubular components slightly away from one another. This may also create friction between the respective threads of the two tubular components. In either embodiment, the friction between the respective threads of the tubular components increases the ability of the tubular components to transfer torsional loads between one another. Additionally, the use of the flanges and plurality of fasteners enables the coupling of the tubular components without high-torque devices, which improves efficiency and simplicity of coupling the tubular components. For example, coupling tubular components using the system and methods disclosed herein may be faster, cheaper, and less complicated than coupling tubular components with a traditional high-torque device of a drilling rig.

Figure 1:
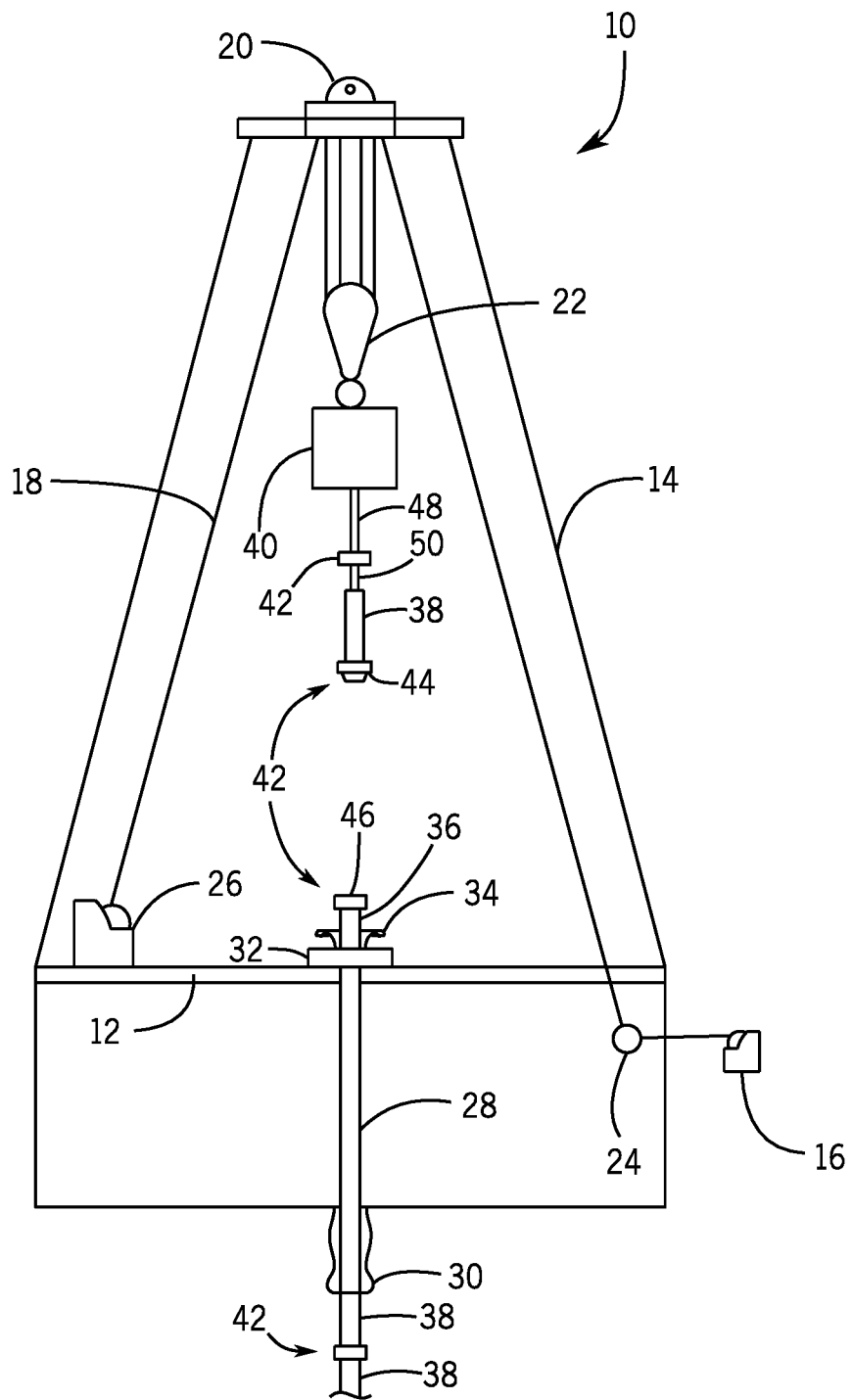
FIG. 1 is a schematic of a well being drilled, in accordance with present techniques.

Turning now to the figures, FIG. 1 is a schematic of a drilling rig 10 in the process of drilling a well, in accordance with present techniques. The drilling rig 10 features an elevated rig floor 12 and a derrick 14 extending above the rig floor 12. A supply reel 16 supplies drilling line 18 to a crown block 20 and traveling block 22 configured to hoist various types of drilling equipment above the rig floor 12. The drilling line 18 is secured to a deadline tiedown anchor 24, and a drawworks 26 regulates the amount of drilling line 18 in use and, consequently, the height of the traveling block 22 at a given moment. Below the rig floor 12, a drill string 28 extends downward into a wellbore 30 and is held stationary with respect to the rig floor 12 by a rotary table 32 and slips 34. A portion of the drill string 28 extends above the rig floor 12, forming a stump 36 to which another length of tubular 38 may be added.

During operation, a top drive 40 and other components hoisted by the traveling block 22 may engage and position the tubular 38 above the wellbore 30. The top drive 40 may then lower the coupled tubular 38 into axial abutment with the stump 36, and the tubular 38 may be rotated (e.g., manually) to initially engage threads of the tubular 38 with threads of the stump 36. Thereafter, a tubular coupling system 42 may be used to further couple the tubular 38 with the stump 36 and pre-load or energize the connection between the tubular 38 and the stump 36. For example, the tubular coupling system 42 may include a first component 44 connected to the tubular 38 and a second component 46 connected to the stump 36 (e.g., the drill string 28). The first and second components 44 and 46 of the tubular coupling system 42 may then be coupled to a plurality of mechanical fasteners to reinforce and energize the coupling between the tubular 38 and the stump 36. Once the tubular coupling system 42 is actuated or energized, the tubular 38 becomes part of the drill string 28, and the drill string 28 is further lowered into the wellbore 30. In other words, the drill string 28 disposed within the wellbore 30 may include tubulars 38 coupled to one another by tubular coupling systems 42.

It should be noted that present embodiments of the tubular coupling system 42 may also be utilized with drill pipe, casing, or other types of tubular components, as well as with other threadably engaged components of the drilling rig 10.

The tubular coupling system 42 may be particularly useful for tubulars that are coupled to one another for transferring a torsional load between the two tubulars 38. For example, the drilling rig 10 may include a quill 48 and a saver sub 50 that are coupled to one another via threads and via another tubular coupling system 42 between the quill 48 and the saver sub 50. The tubular coupling system 42 may also be used to couple drill pipe, casing, a mud saver valve, a pipe drive system, a casing drive system, a mud motor, a bottom hole assembly or component thereof, or any other tubular 38 to another threaded component. As discussed in detail below, the tubular coupling system 42 enables coupling of tubular components to one another manually and/or with hand tools and without the use of a high-torque device. Additionally, the tubular coupling system 42 enables two threaded tubular components to be coupled to one another in a pre-loaded or energized state or condition without the use of a high-torque device.

It should be noted that the illustration of FIG. 1 is intentionally simplified to focus on the tubular coupling system 42 described in detail below. Many other components and tools may be employed during the various periods of formation and preparation of the well. Similarly, as will be appreciated by those skilled in the art, the orientation and environment of the well may vary widely depending upon the location and situation of the formations of interest. For example, rather than a generally vertical bore, the well, in practice, may include one or more deviations, including angled and horizontal runs. Similarly, while shown as a surface (land-based) operation, the well may be formed in water of various depths, in which case the topside equipment may include an anchored or floating platform.

FIG. 2 is an exploded perspective view of an embodiment of the tubular coupling system 42, which may be used to couple two tubulars 38 (e.g., a first tubular 100 and a second tubular 102) to one another. As mentioned above, the tubulars 38 (e.g., oilfield tubulars) may be drill pipe, casing, a mud saver valve, a pipe drive system, a casing drive system, a mud motor, a bottom hole assembly or component thereof, or any other tubular 38 of the drilling rig 10.

In the illustrated embodiment, the tubular coupling system 42 includes a first flange 104 and a second flange 106. The first flange 104 is configured to be coupled to the first tubular 100, and the second flange 106 is configured to be coupled to the second tubular 102. In certain embodiments, the flanges 104 and 106 may be coupled to respective tubulars 38 (e.g., tubulars 100 and 102) via threading. For example, an outer diameter 108 of an axial end 110 of the first tubular 100 may include threads 112 that correspond with threads 114 formed on an inner diameter 116 of the first flange 104. The first flange 104 may be coupled to the axial end 110 of the first tubular 100 by engaging the threads 112 and 114 with one another. Similarly, an outer diameter 118 of an axial end 119 of the second tubular 102 may include threads 120 that engage with threads 122 formed on an inner diameter 124 of the second flange 106 to enable coupling of the second flange 106 to the second tubular 102. However, in other embodiments, the first and second flanges 104 and 106 may be coupled to the first and second tubulars 100 and 102, respectively, via other manners. For example, the flanges 104 and 106 may be welded to the first and second tubulars 100 and 102 or integrally formed (e.g., as one piece) with the first and second tubulars 100 and 102, respectively.

Once the flanges 104 and 106 are coupled to the first and second tubulars 100 and 102, respectively, the first and second tubulars 100 and 102 may be coupled to one another. Specifically, the first and second tubulars 100 and 102 may be coupled to one another manually or with hand tools (i.e., without the use of a high-torque device). As will be appreciated, the tubulars 100 and 102 may have a typical pin and box threaded connection. In other words, the tubulars 100 and 102 are axially aligned with one another, and the axial end 119 of the second tubular 102 may be inserted into the axial end 110 of the first tubular 100. Thereafter, the tubulars 100 and 102 may be rotated relative to one another, such that threads 126 of the axial end 119 of the second tubular 102 engage with threads (not shown) formed on an inner diameter of the axial end 110 of the first tubular 100. As the tubulars 100 and 102 are rotated relative to one another to become threadingly engaged, the flanges 104 and 106 are axially translated towards one another. The tubulars 100 and 102 may be rotated in this manner until the tubulars 100 and 102 can no longer be rotated manually or using hand tools. At this point, the tubulars 100 and 102 are initially coupled to one another, and the flanges 104 and 106 axially abut one another and/or are axially adjacent to one another.

Once the tubulars 100 and 102 are initially coupled to one another and the flanges 104 and 106 are in axial abutment, a plurality of fasteners 128 may be coupled to the flanges 104 and 106. As shown, the first flange 104 includes a plurality of openings 130 (e.g., apertures) arrayed about a circumference 132 of the first flange 104, and the second flange 106 includes a plurality of fastener openings 134 (e.g., apertures or recesses) arrayed about a circumference 136 of the second flange 106. The openings 130 and 134 may be evenly spaced about the circumferences 132 and 136, respectively, or the openings 130 and 132 may have varying spacing. Each of the openings 130 of the first flange 104 axially aligns with a respective fastener opening 134 of the second flange 106. As a result, each of the axially aligned openings 130 and fastener openings 134 may receive one of the fasteners 128. For example, the fasteners 128 may be bolts, screws, or other mechanical fasteners that extend through one of the openings 130 and one of the fastener openings 134 to couple the first and second flanges 104 and 106 to one another. In some embodiments, the openings 130 and/or the openings 134 may include threads configured to engage with threads of the fasteners 128 to further enable coupling of the fasteners 128 to the flanges 104 and 106. As described below with reference to FIGS. 7 and 8, other embodiments of the tubular coupling system 42 may include the second flange 106 without the plurality of openings 134.

As the fasteners 128 are coupled to the flanges 104 and 106, the flanges 104 and 106 may be drawn axially toward one another. As a result, the first and second tubulars 100 and 102, which are already threadingly engaged to one another, may also drawn further towards one another. As the first and second tubulars 100 and 102 are drawn closer to one another, as indicated by arrows 138 and 140, the threads of the tubulars 100 and 102 (e.g., threads 126) become more frictionally engaged with one another. That is, the interlocking threads 126 of the tubulars 100 and 102 are compressed against one another, thereby increasing frictional engagement between the interlocking threads 126. In this manner, the threaded connection between the first and second tubulars 100 and 102 may become energized or substantially pre-loaded to a torque specification. Thus, the first and second tubulars 100 and 102 may be capable of transferring torsional loads to one another.

However, in other embodiments where the second flange 106 does not include the fastener openings 134, the fasteners 128 may be threaded through the openings 130 of the first flange 104, and the fasteners 128 may axially abut the second flange 106. As the fasteners 128 are threaded further into the openings 130 of the first flange 104, the axial abutment between the fasteners 128 and the second flange 106 may force the first and second flanges 104 and 106 axially away from one another. This force may be transferred to the first and second tubulars 100 and 102 by the first and second flanges 104 and 106, respectively. As the first and second tubulars 100 and 102 are driven axially away from one another, the threaded connection between the first and second tubulars 100 and 102 may become energized or substantially pre-loaded to a torque specification. Thus, the first and second tubulars 100 and 102 may be capable of transferring torsional loads to one another.

As will be appreciated, the fasteners 128 have a diameter substantially smaller than the diameter of the first and second tubulars 100 and 102. Thus, the fasteners may be torqued and coupled to the first and second flanges 104 and 106 manually and/or using hand tools (i.e., without a high-torque device). For example, the fasteners 128 may be standard bolts that can be tightened using a hand held torque wrench. In certain embodiments, the tubular coupling system 42 may use 4, 5, 6, 7, 8, 9, 10, 11, 12, 13, 14, 15, 16 or more fasteners 128 to enable coupling of the first and second tubulars 100 and 102 to a specified torque without the use of high-torque devices. Coupling of the first and second tubulars 100 and 102 to a specified torque or load manually and/or using hand tools may be more simple and cost-effective than coupling the tubulars 100 and 102 in a traditional manner (e.g., using a high-torque device).

The first and second tubulars 100 and 102 may be decoupled from one another by disengaging the tubular coupling system 42 and then subsequently unthreading the first and second tubulars 100 and 102 from one another. More specifically, the fasteners 128 may be removed from the first and second flanges 104 and 106 manually or using hand tools (e.g., without a high-torque device). Thereafter, the first and second tubulars 100 and 102 may be unthreaded from one another manually or using hand tools (e.g., without a high-torque device). Thus, as with coupling the first and second tubulars 100 and 102 to one another using the tubular coupling system 42, the first and second tubulars 100 and 102 may be decoupled from one another in a more simple and cost-effective manner.

FIG. 3 is a cross-sectional side view of the first and second tubulars 100 and 102 coupled to one another with the tubular coupling system 42. As described above, the tubular coupling system 42 has the first flange 104 and the second flange 106, which are coupled with the fasteners 128 to energize or pre-load the threaded coupling between the first and second tubulars 100 and 102. As described above, the first flange 104 may be welded, threaded, or otherwise attached to the first tubular 100, and the second flange 106 may be similarly coupled to the second tubular 102. In some embodiments, one of the first or second flanges 104 or 106 may be welded to the respective first or second tubular 100 or 102, and the other of the first or second flange 104 or 106 may be threaded to the respective first or second tubular 100 or 102. In other words, the first and second flanges 104 and 106 may be coupled to the first and second tubulars 100 and 102, respectively, in the same manner or in different manners.

As mentioned above, the first and second tubulars 100 and 102 may have a traditional pin and box connection between one another. That is, the axial end of one tubular (e.g., the second tubular 102) may fit within the axial end of another tubular (e.g., the first tubular 100). In the illustrated embodiment, the axial end 119 of the second tubular 102 is inserted into the axial end 110 of the first tubular 100, and threads of the axial end 119 of the second tubular 102 engage with threads formed on an inner diameter of the axial end 110 of the first tubular 100. Additionally, when the second tubular 102 is threaded to the first tubular 100, an axial end face 150 of the second tubular 102 abuts an interior shoulder 152 formed inside the axial end 110 of the first tubular 100. Thus, further axial movement of the second tubular 102 into the first tubular 100 is blocked.

After the first and second tubulars 100 and 102 are initially threaded together, the tubular coupling system 42 is fastened together in the manner described above. That is, the fasteners 128 may be coupled to the first and second flanges 104 and 106 to draw the first and second flanges 104 and 106 closer to one another, as indicated by arrows 170 and 172. As further axial movement of the second tubulars 102 into the first tubular 100 is blocked by abutment of the axial end face 150 and the interior shoulder 152, the further coupling of the first and second tubulars 100 and 102 via coupling of the flanges 104 and 106 may result in increased axial friction between the respective threads of the first and second tubulars 100 and 102. In other words, as the first and second tubulars 100 and 102 are drawn closer to one another via coupling of the first and second flanges 104 and 106 with the fasteners 128, the respective threads of the first and second tubulars 100 and 102 may be compressed, pressurized, or squeezed together because further axial movement between the first and second tubulars 100 and 102 is blocked by abutment of the axial end face 150 and the interior shoulder 152. With the respective threads of the first and second tubulars 100 and 102 compressed or pressurized, the first and second tubulars 100 and 102 may be capable of transmitting elevated levels of torque between one another.

FIG. 4 is a cross-sectional side view, taken within line 4-4 of FIG. 3, illustrating the coupling of the first flange 104 and the second flange 106 of the tubular coupling system 42 via one of the fasteners 128. As discussed above, multiple fasteners 128 are used about the circumference of the tubular coupling system 42 and are coupled to the first and second flanges 104 and 106. In the illustrated embodiment, the first flange 104 is coupled to the first tubular 100 via the threads 112 and 114, as described with reference to FIG. 2. Similarly, the second flange 106 is coupled to the second tubular 102 via the threads 120 and 122, as also described with reference to FIG. 2.

As shown, one of the fasteners 128 extends through a respective one of the openings 130 arrayed about the circumference 132 of the first flange 104 and then engages with a respective one of the fastener openings 134. While the illustrated embodiment shows the fastener opening 134 extending only partially through the second flange 104, in other embodiments the fastener opening 134 may extend completely through the second flange 104 (similar to the openings 130 formed in the first flange 102). As mentioned above, in some embodiments the fasteners 128 may be bolts (e.g., threaded bolts). In such embodiments, the fasteners 128 (e.g., threaded bolts) may extend through the openings 130 of the first flange 104 (which may not have threads) and engage with corresponding threads formed in the fastener openings 134 of the second flange 106. To tighten the fasteners 128 and thereby draw the first and second flanges 104 and 106 toward one another, a head 154 of each fastener 128 may be rotated manually or with a hand tool (e.g., without a high-torque device). For example, a torque wrench, screw driver, crescent wrench, or other torque-transmitting hand tool may be used to connect the fasteners 128 to the first and second flanges 104 and 106. As the fastener 128 is threaded into the respective fastener opening 134 of the second flange 106, the head 154 of the fastener 128 axially abuts the first flange 104. This abutment and the threaded engagement between the fastener 128 and the fastener opening 134 of the second flange 106 draws the first and second flanges 104 and 106 toward one another, which thereby draws the first and second tubulars 100 and 102 toward one another, as indicated by arrows 170 and 172. With this action, the respective threads of the first and second tubulars 100 and 102 may be compressed, pressurized, or squeezed together to pre-load or energize the connection between the first and second tubulars 100 and 102. As discussed above, coupling of the first and second tubulars 100 and 102 to an energized or pre-loaded condition using the tubular coupling system 42 (e.g., the first and second flanges 104 and 106 and the fasteners 128) improves efficiency and simplicity of coupling the first and second tubulars 100 and 102 because the tubular coupling system 42 may be used without a high-torque device.

Figure 6:
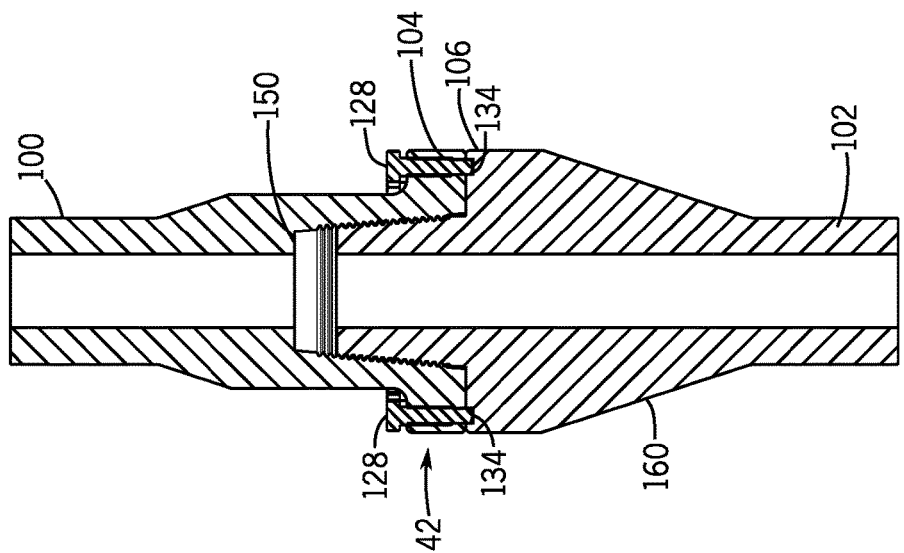
FIG. 6 is a cross-sectional side view of a tubular coupling system connecting two tubular components, in accordance with present techniques.
Figure 5:
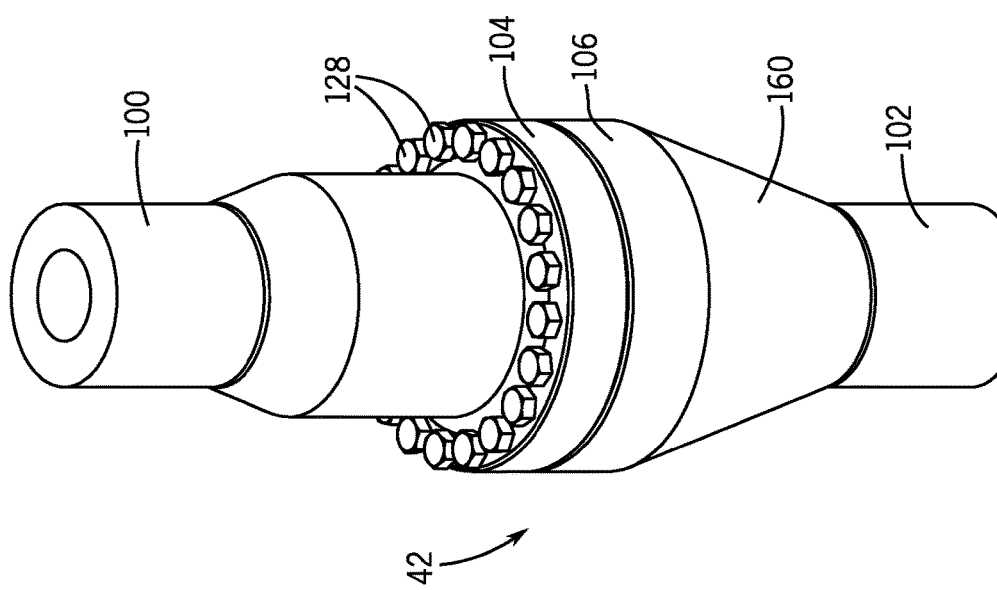
FIG. 5 is a perspective view of a tubular coupling system connecting two tubular components, in accordance with present techniques.

As noted above, in certain embodiments, the first and second flanges 104 and 106 may be integrally formed with the first and second tubulars 100 and 102, respectively. For example, FIGS. 5 and 6 illustrate an embodiment of the first and second tubulars 100 and 102 having the tubular coupling system 42, where the first and second flanges 104 and 106 are integrally formed with the first and second tubulars 100 and 102, respectively. Specifically, FIG. 5 is a perspective view of the first and second tubulars 100 and 102 having the integrally formed flanges 104 and 106, and FIG. 6 is a cross-sectional side view of the first and second tubulars 100 and 102 having the integrally formed flanges 104 and 106.

The flanges 104 and 106 may be integrally formed with the first and second tubulars 100 and 102 using a variety of processes. For example, a casting, molding, machining, welding, or other suitable process may be used to integrally form the flanges 104 and 106 with the first and second tubulars 100 and 102. In the embodiment shown in FIGS. 5 and 6, the second tubular 102 also includes a chamfered transition region 160 extending between the second flange 106 and the tubular 102. As will be appreciated, the chamfered transition region 160 may reduce stress concentrations and generally improve the strength of the tubular 102 and the second flange 106. The first tubular 100 and the first flange 104, on the other hand, do not include a chamfered transition region between the two. However, other embodiments may or may not include other suitable configurations and geometric features (e.g., chamfered transition region 160) between the tubulars 100 and 102 and respective flanges 104 and 106.

As will be appreciated, embodiments where the flanges 104 and 106 are integrally formed with the first and second tubulars 100 and 102 may include similar features to the embodiments discuss above with reference to FIGS. 2-4. For example, as shown in FIG. 6, the first flange 104 integrally formed with the first tubular 100 includes the plurality of openings 130 configured to receive respective fasteners 128, and the second flange 106 integrally formed with the second tubular 102 includes the plurality of fastener openings 134 configured to retain the fasteners 128.

Figure 8:
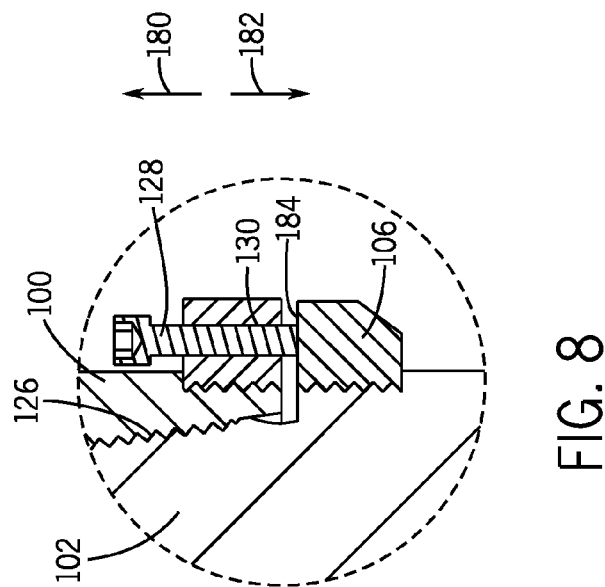
FIG. 8 is cross-sectional side view of the tubular coupling system of FIG. 7, taken within line 8-8 of FIG. 7, in accordance with present techniques.
Figure 7:
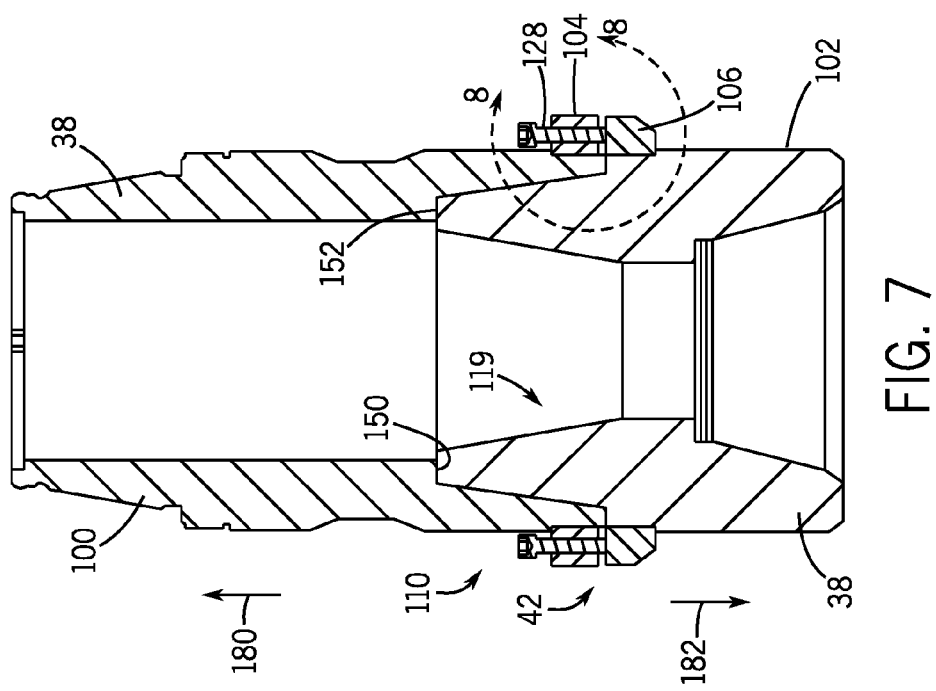
FIG. 7 is a cross-sectional side view of a tubular coupling system connecting two tubular components, in accordance with present techniques.

FIGS. 7 and 8 illustrate an embodiment of the tubular coupling system 42 where the second flange 106 does not include the plurality of fastener openings 134. Specifically, FIG. 7 is a cross-sectional side view of the first and second tubulars 100 and 102 coupled to one another with the tubular coupling system 42, and FIG. 8 is a cross-sectional side view, taken within line 8-8 of FIG. 4, illustrating the coupling of one of the fasteners to the first flange 104 and the second flange 106 of the tubular coupling system 42. In the embodiments shown in FIGS. 7 and 8, each of the fasteners 128 is threaded into a respective one of the openings 130 formed in the first flange 104. As the fastener 128 is threaded into one of the openings 130, the fastener 128 will contact and axially abut an upper axial surface 184 of the second flange 106. As threading of the fastener 128 into the opening 130 continues, the contact between the upper axial surface 184 of the second flange 106 and the fastener 128 will drive the first and second flanges 104 and 106 axially away from one another, as indicated by arrows 180 and 182. Thus, the first and second tubulars 100 and 102, which are already threaded to one another via respective integral threads 126, are also driven axially away from one another, as indicated by arrows 180 and 182. As the first and second tubulars 100 and 102 are driven away from one another via the contact between the fastener 128 and the upper axial surface 184 of the second flange 106, the respective threads of the first and second tubulars 100 and 102 may be compressed, pressurized, or squeezed together, as similarly described above. With the respective threads of the first and second tubulars 100 and 102 compressed or pressurized, the threaded connection between the first and second tubulars 100 and 102 may be energized or pre-loaded, and the first and second tubulars 100 and 102 may be capable of transmitting elevated levels of torque between one another.

As discussed above, present embodiments provide the tubular coupling system 42 for coupling the first tubular 100 (e.g., section of casing or drill pipe) to the second tubular 102 (e.g., section of casing or drill pipe) of the mineral extraction system 10. As The tubular coupling system 42 includes two coupling rims or flanges 104 and 106 to which the plurality of mechanical fasteners 128, such as bolts, may be coupled. The first flange 104 may be coupled to an end the first tubular 100, and the second flange 106 may be coupled to an end of the second tubular 102. The ends (e.g., axial ends 110 and 119) of the two tubulars 100 and 102 may be initially threaded together via respective integral threads 126 of the tubulars 100 and 102 (e.g., manually or using hand tools) until threading manually or with hand tools is no longer possible or practical. As the two tubulars 100 and 102 are initially threaded together, the flanges 104 and 106 of the tubular coupling system 42 axially approach one another. Thereafter, the plurality of mechanical fasteners 128 may be mechanically fastened to the flange 104 and/or 106. The fasteners 128 may also be coupled to the flange 104 and/or 106 manually and/or using hand tools. In some embodiments, the coupling of the mechanical fasteners 128 draws the flanges 104 and 106, and thus the first and second tubulars 100 and 102, toward one another. In other embodiments, the coupling of the mechanical fasteners drives the flanges 104 and 106, and thus the first and second tubulars 100 and 102, away from one another. In either case, the integral threads 126 of the tubulars 100 and 102 may be compressed, pressurized, and/or energized to a pre-loaded condition without the use of a high-torque device. Specifically, the coupling of the fasteners 128 to the flanges 104 and 106 brings the two threaded tubulars 100 and 102 closer to one another or drives the two threaded tubulars 100 and 102 away from one another to create friction between the threads 126 of the two tubulars 100 and 102. This friction between the respective threads 126 of the tubulars 100 and 102 increases the ability of the tubulars 100 and 102 to transfer torsional loads between one another. Additionally, the use of the flanges 104 and 106 and the plurality of fasteners 128 enables the coupling of the tubular components without high-torque devices, which improves efficiency and simplicity of coupling the tubular components. For example, coupling tubular components using the tubular coupling system 42 discussed above may be faster, cheaper, and less complicated than coupling tubular components with a traditional high-torque device of a drilling rig.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A mineral extraction system, comprising
    a first oilfield tubular comprising a box connection having an axial shoulder;
    a second oilfield tubular comprising a pin connection having an axial end face, the pin connection configured to threadingly engage with the first oilfield tubular within the box connection, and wherein the axial end face is configured to abut the axial shoulder when the pin connection is fully threaded within the box connection;
    a first flange coupled to the first oilfield tubular;
    a second flange coupled to the second oilfield tubular; and
    a plurality of fasteners configured to couple to the first flange and the second flange.

2. The system of claim 1, wherein the first flange is threaded to the first oilfield tubular, or the first flange is integrally formed with the first oilfield tubular.

3. The system of claim 2, wherein, the second flange is threaded to the second oilfield tubular, or the second flange is integrally formed with the second oilfield tubular.

4. The system of claim 1, wherein the first oilfield tubular is a first length of casing, and the second oilfield tubular is a second length of casing.

5. The system of claim 1, wherein the plurality of fasteners comprises a plurality of threaded bolts.

6. A method, comprising:
    threading a first oilfield tubular component to a second oilfield tubular component;
    abutting a first flange of the first oilfield tubular component with a second flange of the second oilfield tubular component;
    abutting an axial end surface of the second oilfield tubular component against an axial shoulder of a box connection of the first oilfield tubular component after threading the first oilfield tubular component to the second oilfield tubular component;
    subsequent to abutting the first flange of the first oilfield tubular component with the second flange of the second oilfield tubular component, coupling the first flange and the second flange to a plurality of fasteners disposed about a circumference of the first flange and the second flange.

7. The method of claim 6, wherein coupling the first flange to the second flange with the plurality of fasteners comprises threading each of the plurality of fasteners through respective apertures of the first and second flanges manually or with a hand tool.

8. The method of claim 6, comprising threading the first oil field tubular component to the second oilfield tubular component manually or with a hand tool.

9. The method of claim 6, comprising threading the first flange to the first oilfield tubular component or integrally forming the first flange with the first oilfield tubular component before threading the first oilfield tubular component to the second oilfield tubular component.

10. The method of claim 9, comprising threading the second flange to the second oilfield tubular component or integrally forming the second flange with the second oilfield tubular component before threading the first oilfield tubular component to the second oilfield tubular component.

11. The method of claim 6, comprising transferring torque from the first oilfield tubular component to the second oilfield tubular component after coupling the first flange to the second flange with the plurality of fasteners.

12. The method of claim 6, comprising removing the plurality of fasteners from the second flange and the first flange manually or with a hand tool and subsequently unthreading the first oilfield tubular component from the second oilfield tubular component.

13. A mineral extraction system, comprising:
a first oilfield tubular, wherein the first oilfield tubular comprises a threaded box connection at a first axial end of the first oilfield tubular;
a second oilfield tubular, wherein the second oilfield tubular comprises a threaded pin connection at a second axial end of the second oilfield tubular;
a first flange threaded to the first axial end of the first oilfield tubular, wherein the first flange comprises a plurality of apertures arrayed about a first circumference of the first flange; and
a second flange threaded to the second axial end of the second oilfield tubular, wherein the second flange comprises a plurality of recesses arrayed about a second circumference of the second flange,
wherein each of the plurality of apertures is configured to align with a respective one of the plurality of recesses.

14. The system of claim 13, comprising a plurality of fasteners, wherein each of the plurality of fasteners is configured to couple to a respective one of the plurality of apertures and a respective one of the plurality of recesses.

15. The system of claim 14, wherein the plurality of fasteners comprises a plurality of threaded bolts configured to be coupled to the first and second flanges via a hand tool.

* * * * *